(12) United States Patent
Chou et al.

(10) Patent No.: US 11,402,601 B2
(45) Date of Patent: Aug. 2, 2022

(54) PLASTIC LENS ASSEMBLY, IMAGING LENS MODULE AND ELECTRONIC DEVICE

(71) Applicant: LARGAN PRECISION CO., LTD., Taichung (TW)

(72) Inventors: Ming-Ta Chou, Taichung (TW); Hsiang-Chi Tang, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 225 days.

(21) Appl. No.: 16/522,843

(22) Filed: Jul. 26, 2019

(65) Prior Publication Data
US 2020/0158987 A1    May 21, 2020

(30) Foreign Application Priority Data

Nov. 21, 2018  (TW) ................. 107141532

(51) Int. Cl.
*G02B 7/02* (2021.01)
*G02B 1/04* (2006.01)
(Continued)

(52) U.S. Cl.
CPC ............. *G02B 7/025* (2013.01); *G02B 1/041* (2013.01); *G02B 7/021* (2013.01); *G02B 7/022* (2013.01);
(Continued)

(58) Field of Classification Search
CPC ........ G02B 7/025; G02B 1/041; G02B 7/021; G02B 13/0045; G02B 13/006; G02B 9/64; G02B 7/022; G02B 13/18; G02B 27/0025
See application file for complete search history.

(56) References Cited

U.S. PATENT DOCUMENTS

| 7,411,738 B1 | 8/2008 | Chang |
| 7,471,457 B2 | 12/2008 | Takahashi |

(Continued)

FOREIGN PATENT DOCUMENTS

| CN | 203759336 U | 8/2014 |
| CN | 108181697 A | 6/2018 |

(Continued)

*Primary Examiner* — Darryl J Collins
*Assistant Examiner* — Matthew Y Lee
(74) *Attorney, Agent, or Firm* — McClure, Qualey & Rodack, LLP

(57) ABSTRACT

A plastic lens assembly includes at least two plastic lens elements and at least one cementing glue coating. The plastic lens elements include a first plastic lens element and a second plastic lens element. The first plastic lens element has a first optical effective portion and a first peripheral portion, wherein the first peripheral portion surrounds the first optical effective portion. The second plastic lens element has a second optical effective portion and a second peripheral portion, wherein the second peripheral portion surrounds the second optical effective portion. The cementing glue coating is disposed between the first optical effective portion and the second optical effective portion, and for cementing the first plastic lens element and the second plastic lens element, wherein at least one optical gap is formed between the first optical effective portion and the second optical effective portion.

20 Claims, 14 Drawing Sheets

(51) Int. Cl.
  *G02B 13/00*  (2006.01)
  *G02B 9/64*  (2006.01)
(52) U.S. Cl.
  CPC ............. *G02B 9/64* (2013.01); *G02B 13/006* (2013.01); *G02B 13/0045* (2013.01)

(56) References Cited

U.S. PATENT DOCUMENTS

| | | |
|---|---|---|
| 8,934,183 B2 | 1/2015 | Maetaki |
| 10,185,059 B2 | 1/2019 | Maetaki |
| 10,670,828 B2 | 6/2020 | Chang et al. |
| 2009/0002853 A1* | 1/2009 | Yuan ................ G02B 7/022 |
| | | 359/819 |
| 2010/0116973 A1 | 5/2010 | Maetaki |
| 2013/0271853 A1* | 10/2013 | Yang ................ G02B 13/006 |
| | | 359/793 |
| 2015/0226931 A1 | 8/2015 | Huang |
| 2015/0323708 A1 | 11/2015 | Hashimoto et al. |
| 2018/0129017 A1 | 5/2018 | Huang et al. |
| 2019/0310438 A1 | 10/2019 | Komiyama |

FOREIGN PATENT DOCUMENTS

| | | |
|---|---|---|
| JP | 5235619 B2 | 7/2013 |
| TW | M553425 U | 12/2017 |
| TW | I614536 B | 2/2018 |
| WO | 2014097980 A1 | 6/2014 |

\* cited by examiner

PLASTIC LENS ASSEMBLY, IMAGING LENS MODULE AND ELECTRONIC DEVICE

RELATED APPLICATIONS

This application claims priority to Taiwan Application Serial Number 107141532, filed Nov. 21, 2018, which is herein incorporated by reference.

BACKGROUND

Technical Field

The present disclosure relates to a plastic lens assembly and an imaging lens module. More particularly, the present disclosure relates to a plastic lens assembly and an imaging lens module applicable to portable electronic devices.

Description of Related Art

In recent years, portable electronic devices have developed rapidly. For example, intelligent electronic devices and tablets have been filled in the lives of modern people, and camera module mounted on portable electronic devices has also prospered. However, as technology advances, the quality requirements of camera modules are becoming higher and higher. Therefore, in addition to the improvement in optical design, the camera module needs to be improved in manufacturing precision.

SUMMARY

According to one aspect of the present disclosure, a plastic lens assembly includes at least two plastic lens elements and at least one cementing glue coating. The at least two plastic lens elements include a first plastic lens element and a second plastic lens element. The first plastic lens element has a first optical effective portion and a first peripheral portion, wherein the first peripheral portion surrounds the first optical effective portion. The second plastic lens element has a second optical effective portion and a second peripheral portion, wherein the second peripheral portion surrounds the second optical effective portion. The at least one cementing glue coating is disposed between the first optical effective portion and the second optical effective portion, and for cementing the first plastic lens element and the second plastic lens element, wherein at least one optical gap is formed between the first optical effective portion and the second optical effective portion. The cementing glue coating is farther from a center of the first optical effective portion than the optical gap is therefrom. When a refractive index of the optical gap is Na, and a refractive index of the cementing glue coating is Ng, the following condition is satisfied:

$$0.52 < Na/Ng < 1.0.$$

According to another aspect of the present disclosure, an imaging lens module includes the plastic lens assembly of the aforementioned aspect.

According to further another aspect of the present disclosure, an electronic device includes the imaging lens module of the aforementioned aspect.

BRIEF DESCRIPTION OF THE DRAWINGS

The present disclosure can be more fully understood by reading the following detailed description of the embodiment, with reference made to the accompanying drawings as follows:

FIG. 10 is another schematic view of the parameters of the imaging lens module according to the 1st embodiment in FIG. 1A.

DETAILED DESCRIPTION

Figure 1A:
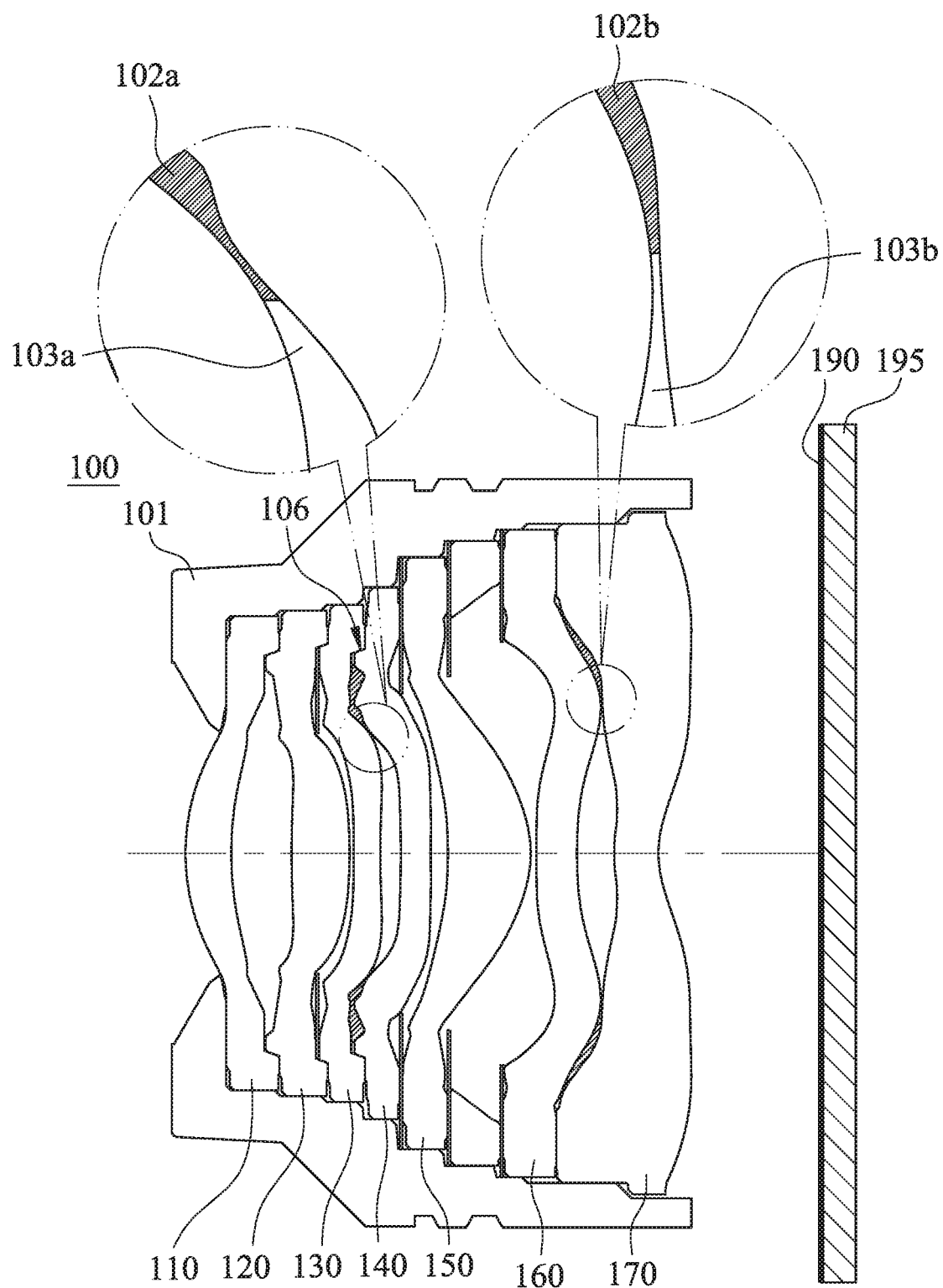
FIG. 1A is a schematic view of an imaging lens module according to the 1st embodiment of the present disclosure.

The present disclosure provides a plastic lens assembly, including at least two plastic lens elements and at least one cementing glue coating. The at least two plastic lens elements include a first plastic lens element and a second plastic lens element. The first plastic lens element has a first optical effective portion and a first peripheral portion, wherein the first peripheral portion surrounds the first optical effective portion. The second plastic lens element has a second optical effective portion and a second peripheral portion, wherein the second peripheral portion surrounds the second optical effective portion. The cementing glue coating is disposed between the first optical effective portion and the second optical effective portion, and for cementing the first plastic lens element and the second plastic lens element, wherein at least one optical gap is formed between the first optical effective portion and the second optical effective portion. The cementing glue coating is farther from a center of the first optical effective portion than the optical gap is therefrom. When a refractive index of the optical gap is Na, and a refractive index of the cementing glue coating is Ng, the following condition is satisfied: $0.52 < Na/Ng < 1.0$. By forming the optical gap at the center of the optical effective portion between the two plastic lens elements, and arranging the cementing glue coating at the position of the effective optical portion close to the peripheral region thereof and the refractive index of the optical gap smaller than the refractive index of the cementing glue coating, the imaging light from the farther field of view can pass through the medium having higher refractive index and the imaging light closer to the center field of view can pass through the medium having lower refractive index. Thus, the converging situation of the imaging light from the farther field of view can be adjusted independently without affecting the light gathering quality of the central field of view, which is favorable for adjusting the light gathering resolution of the specific field of view of the plastic lens assembly.

When the refractive index of the optical gap is Na, and the refractive index of the cementing glue coating is Ng, the following condition is satisfied: $0.56<Na/Ng<0.80$. Therefore, it is favorable for further correcting the imaging light from the farther field of view by more significant ratio configuration between the optical gap and the cementing glue coating, so as to obtain the expected light gathering quality.

The aforementioned optical gap can be an air gap. Therefore, the refractive index between the different field of view can be adjusted only by using the cementing glue coating (such as the material of glue layer) without additional optical material.

When a width of the optical gap close to a central axis of the plastic lens assembly is d, and a maximum width of the optical gap close to the cementing glue coating is ET, the following condition is satisfied: $0<ET/d<0.90$. Because the optical gap has uneven thickness, by the aforementioned arrangement which is favorable for gathering the imaging light, and the wider part close to the central axis is favorable for avoiding the cementing glue coating from being close to the center of the lens element. Moreover, the following condition is satisfied: $0<ET/d<0.40$. Therefore, it is favorable for effectively controlling the cementing glue coating to flow toward the direction away from the center of the lens element by maintaining the significant width proportion.

When a central thickness of the cementing glue coating is ETM, the following condition is satisfied: $0.02$ mm$<ETM<0.12$ mm. Therefore, it is favorable for avoiding an internal stress inside of the cementing glue coating which is generated during a drying process from pulling the lens element by maintaining thin thickness of the cementing glue coating, so as to decrease redundant stress which is left over and avoid the air bubble from accumulating therein.

When the refractive index of the optical gap is Na, the refractive index of the cementing glue coating is Ng, and a refractive index of the first plastic lens element is N1, the following condition is satisfied: $Na/Ng<Na<N1/Na$. Therefore, it is favorable for reducing the flare from surface reflection between the first plastic lens element and the second plastic lens element by arranging the refractive index of the first plastic lens element larger than the refractive index of the cementing glue coating. It should be mentioned that the refractive index of the optical gap Na can be 1.

When a maximum width of the cementing glue coating farthest from the optical gap is ETT, and the central width of the cementing glue coating is ETM, the following condition is satisfied: $0.1<ETT/ETM<1.5$. Therefore, the thickness of the middle area of the cementing glue coating would not be too thin, so that the material of the cementing glue coating would not overflow from the plastic lens element easily which would generate the defect of insufficient filling in an area expected to be filled with the material of the cementing glue coating.

When the maximum width of the optical gap close to the cementing glue coating is ET, and the central width of the cementing glue coating is ETM, the following condition is satisfied: $0.1<ET/ETM<1.5$. Therefore, the middle area of the cementing glue coating can be fuller which is favorable for avoiding the material of the cementing glue coating flowing toward the optical gap. Moreover, the following condition is satisfied: $0.1<ET/ETM<1.0$. Hence, it is favorable for reducing the air bubbles accumulating in the cementing glue coating by arranging the better width proportion.

The optical gap can be gradually reduced from a position close to a center region thereof to a peripheral region thereof. Accordingly, the narrow opening design of the optical gap can be provided to avoid the internal reflection.

Both of two surfaces of the cementing glue coating can be aspheric. Therefore, the light gathering quality of the imaging light can be adjusted so as to improve the situation of the image curvature effectively.

Both of two surfaces of the optical gap can be aspheric. Therefore, the inflection point can be arranged on the plastic lens element by the aspheric characteristic of the optical gap so as to improve off-axis aberration.

When a vertical distance between a position of the optical gap farthest from the central axis and the central axis is Yet, and a maximum radius of the optical effective portion of the first plastic lens element facing to the cementing glue coating is Y12, the following condition is satisfied: $Yet/Y12<0.95$. Therefore, it is favorable for improving the image curvature without affecting the light from near field of view by letting little part of the imaging light from the farther field of view passes through the cementing glue coating. Moreover, the following condition is satisfied: $Yet/Y12<0.85$. Therefore, most of imaging light from far field of view can pass through the cementing glue coating, which can be further adjusted by the arrangement of the refractive index of the cementing glue coating larger than the refractive index of the optical gap.

When a vertical distance between a position of the optical gap farthest from the central axis and the central axis is Yet, and a maximum radius of the optical effective portion of the second plastic lens element facing to the cementing glue coating is Y21, the following condition is satisfied: $Yet/Y21<0.95$. Therefore, it is favorable for improving the image curvature without affecting the light from near field of view by letting little part of the imaging light from the farther field of view passes through the cementing glue coating. Moreover, the following condition is satisfied: $Yet/Y21<0.85$. Therefore, most of imaging light from far field of view can pass through the cementing glue coating, which can be further adjusted by the arrangement of the refractive index of the cementing glue coating larger than the refractive index of the optical gap.

The plastic lens assembly can further include an aligning structure, which is for aligning the first plastic lens element and the second plastic lens element with each other, wherein the optical gap, the cementing glue coating and the aligning structure are far away from a central axis of the plastic lens assembly along a direction far from the central axis in sequence. Therefore, it is favorable for improving the tilting situation of the two cemented plastic lens elements and achieving the sealed effect so as to improve the overflow situation of the material of the cementing glue coating.

Each of the aforementioned features of the plastic lens assembly can be utilized in various combinations for achieving the corresponding effects.

The present disclosure further provides an imaging lens module, including the aforementioned plastic lens assembly. Accordingly, a better light gathering resolution can be provided for the specific field of view.

The present disclosure further provides an electronic device, including the aforementioned imaging lens module. Accordingly, an electronic device having the better imaging quality is provided.

1st Embodiment

FIG. 1A is a schematic view of an imaging lens module 100 according to the 1st embodiment of the present disclosure. The imaging lens module 100 includes a plastic lens assembly (its reference numeral is omitted) and an image sensor 195, wherein the plastic lens assembly includes a barrel 101, a plurality of lens elements and an image surface 190, the lens elements are disposed in the barrel 101, the image surface 190 is disposed on an image side of the barrel 101, and the image sensor 195 is disposed on the image surface 190.

In detail, the plastic lens elements are, in order from the object side to the image side, a first lens element 110, a second lens element 120, a first plastic lens element 130, a second plastic lens element 140, a fifth lens element 150, a first plastic lens element 160 and a second plastic lens element 170, wherein the plastic lens assembly includes at least two plastic lens elements, and in the 1st embodiment, the number of the plastic lens elements is four, which are the two first plastic lens elements 110, 160 and the two second plastic lens elements 120, 170.

The first plastic lens element 130 has a first optical effective portion (its reference numeral is omitted) and a first peripheral portion (its reference numeral is omitted), wherein the first peripheral portion surrounds the first optical effective portion. The second plastic lens element 140 has a second optical effective portion (its reference numeral is omitted) and a second peripheral portion (its reference numeral is omitted), wherein the second peripheral portion surrounds the second optical effective portion. The imaging lens module 100 includes a cementing glue coating 102a, which is disposed between the first optical effective portion and the second optical effective portion, and for cementing the first plastic lens element 130 and the second plastic lens element 140, wherein an optical gap 103a is formed between the first optical effective portion and the second optical effective portion, the cementing glue coating 102a is farther from a center of the first optical effective portion than the optical gap 103a is therefrom. Moreover, the plastic lens assembly can further include an aligning structure 106 for aligning the first plastic lens element 130 and the second plastic lens element 140 with each other, wherein the optical gap 103a, the cementing glue coating 102a and the aligning structure 106 are far away from a central axis of the plastic lens assembly along a direction far from the central axis in sequence. In the 1st embodiment, the aligning structure 106 includes two surface structures (its reference numeral is omitted) on the first plastic lens element 130 and the second plastic lens element 140, respectively, and the present disclosure will not be limited thereto.

The first plastic lens element 160 has a first optical effective portion (its reference numeral is omitted) and a first peripheral portion (its reference numeral is omitted), wherein the first peripheral portion surrounds the first optical effective portion. The second plastic lens element 170 has a second optical effective portion (its reference numeral is omitted) and a second peripheral portion (its reference numeral is omitted), wherein the second peripheral portion surrounds the second optical effective portion. The imaging lens module 100 includes a cementing glue coating 102b, which is disposed between the first optical effective portion and the second optical effective portion, and for cementing the first plastic lens element 160 and the second plastic lens element 170, wherein an optical gap 103b is formed between the first optical effective portion and the second optical effective portion, the cementing glue coating 102b is farther from a center of the first optical effective portion than the optical gap 103b is therefrom.

In detail, the optical gaps 103a, 103b are air gaps, which is gradually reduced from a position close to a center region thereof to a peripheral region thereof, respectively. Both of two surfaces of the cementing glue coating 102a, 102b are aspheric. Both of two surfaces of the optical gap 103a, 103b are aspheric.

In the 1st embodiment, when a refractive index of the optical gap 103a, 103b is Na, a refractive index of the cementing glue coating 102a, 102b is Ng, the following condition is satisfied: $0.52 < Na/Ng < 1.0$. In detail, the refractive index of the optical gap 103a Na is 1, the refractive index of the cementing glue coating 102a Ng is 1.485, Na/Ng=0.673; the refractive index of the optical gap 103b Na is 1, the refractive index of the cementing glue coating 102b Ng is 1.485, and Na/Ng=0.673. Furthermore, each refractive index of the first plastic lens element 130, 160 is N1, the values are 1.669, 1.669, respectively, and both satisfy the condition, $Na/Ng < Na < N1/Na$.

Figure 1B:
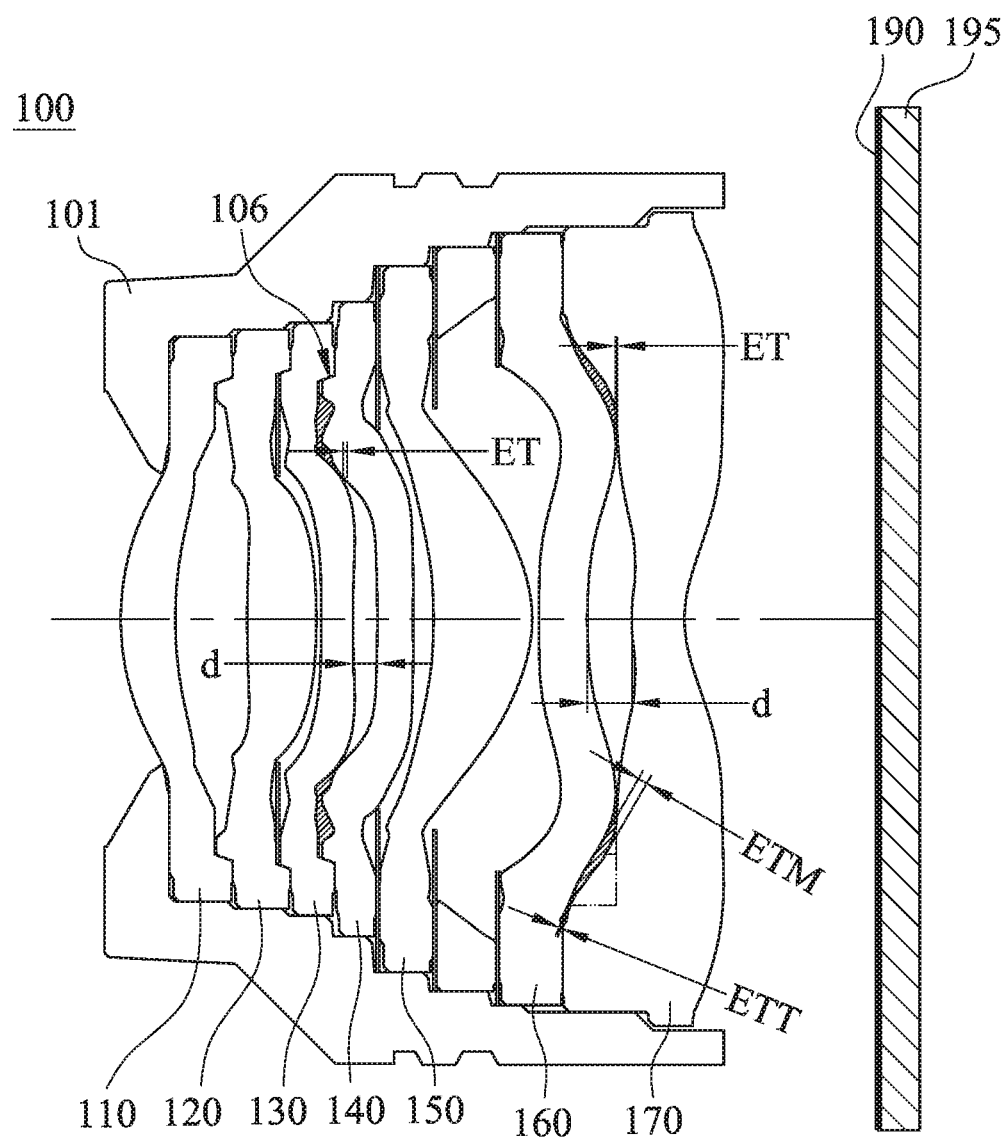
FIG. 1B is a schematic view of the parameters of the imaging lens module according to the 1st embodiment in FIG. 1A.
Figure 1C:
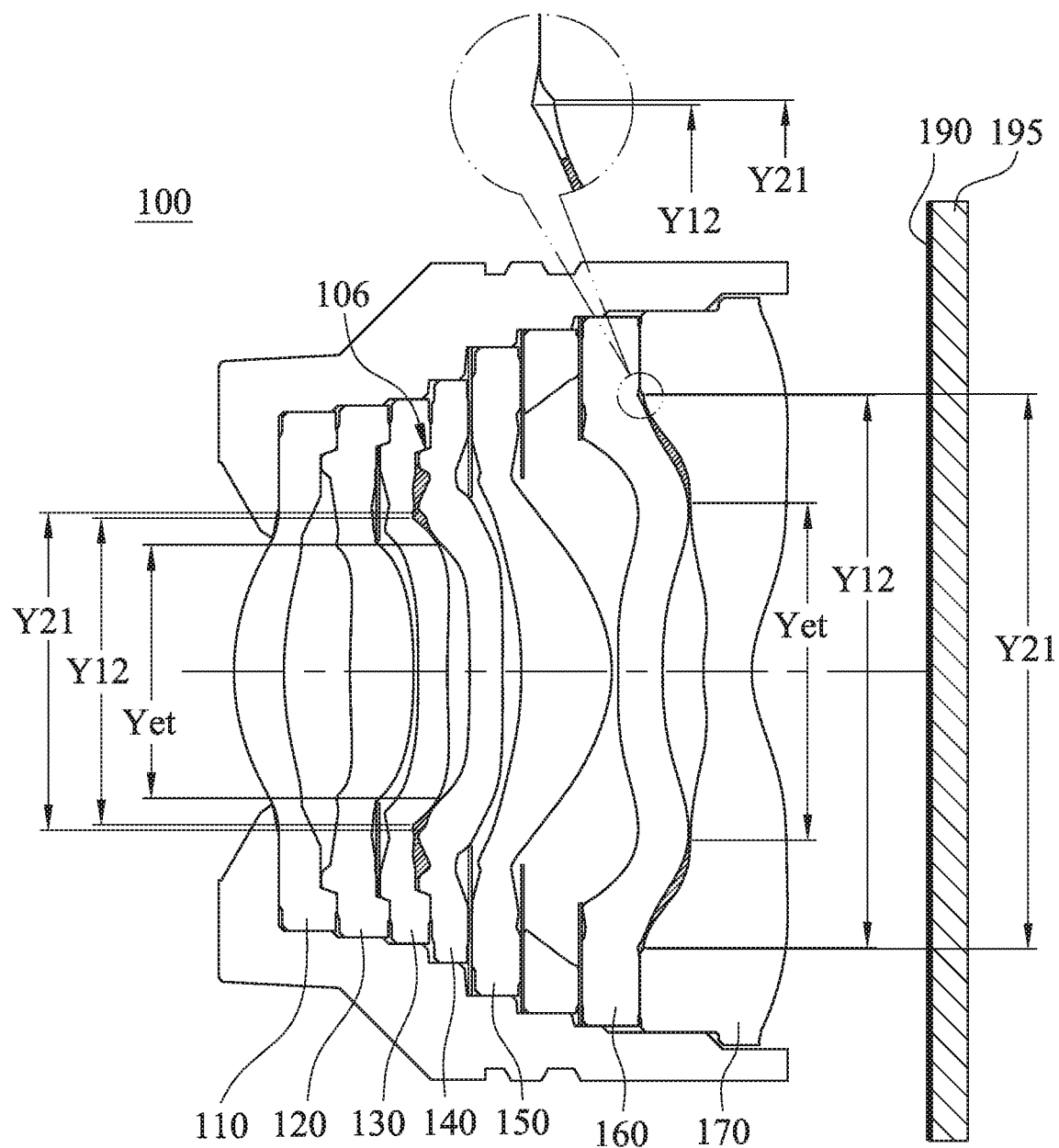

FIG. 1B and FIG. 10 are schematic views of the parameters of the imaging lens module 100 according to the 1st embodiment in FIG. 1A, respectively. As shown in FIG. 1B and FIG. 10, when a width of the optical gap 103a close to the central axis of the plastic lens assembly is d, a maximum width of the optical gap 103a close to the cementing glue coating 102a is ET, a maximum width of the cementing glue coating 102a farthest from the optical gap 103a is ETT, a central width of the cementing glue coating 102a is ETM, a vertical distance between a position of the optical gap 103a farthest from the central axis and the central axis is Yet, a maximum radius of the optical effective portion of the first plastic lens element 130 facing to the cementing glue coating 102a is Y12, and a maximum radius of the optical effective portion of the second plastic lens element 140 facing to the cementing glue coating 102a is Y21, the data in the following Table 1A are satisfied.

TABLE 1A

| 1st Embodiment | | | |
|---|---|---|---|
| d (mm) | 0.1760 | Yet (mm) | 2.0000 |
| ET (mm) | 0.0297 | Y12 (mm) | 2.4237 |
| ET/d | 0.1688 | Y21 (mm) | 2.5078 |
| ETM (mm) | 0.0361 | Yet/Y12 | 0.8252 |
| ETT (mm) | 0.0295 | Yet/Y21 | 0.7975 |
| ETT/ETM | 0.8171 | | |

As shown in FIG. 1B and FIG. 10, which are schematic views of the parameters of the imaging lens module 100 according to the 1st embodiment in FIG. 1A. When a width of the optical gap 103b close to the central axis of the plastic lens assembly is d, a maximum width of the optical gap 103b close to the cementing glue coating 102b is ET, a maximum width of the cementing glue coating 102b farthest from the optical gap 103b is ETT, a central width of the cementing glue coating 102b is ETM, a vertical distance between a position of the optical gap 103b farthest from the central axis and the central axis is Yet, a maximum radius of the optical effective portion of the first plastic lens element 160 facing to the cementing glue coating 102b is Y12, and a maximum radius of the optical effective portion of the second plastic lens element 170 facing to the cementing glue coating 102b is Y21, the data in the following Table 1B are satisfied.

TABLE 1B

| 1st Embodiment | | | |
|---|---|---|---|
| d (mm) | 0.3230 | Yet (mm) | 2.6606 |
| ET (mm) | 0.0162 | Y12 (mm) | 4.3597 |
| ET/d | 0.0502 | Y21 (mm) | 4.3797 |
| ETM (mm) | 0.0686 | Yet/Y12 | 0.6103 |
| ETT (mm) | 0.0157 | Yet/Y21 | 0.6075 |
| ETT/ETM | 0.2289 | | |

2nd Embodiment

Figure 2A:
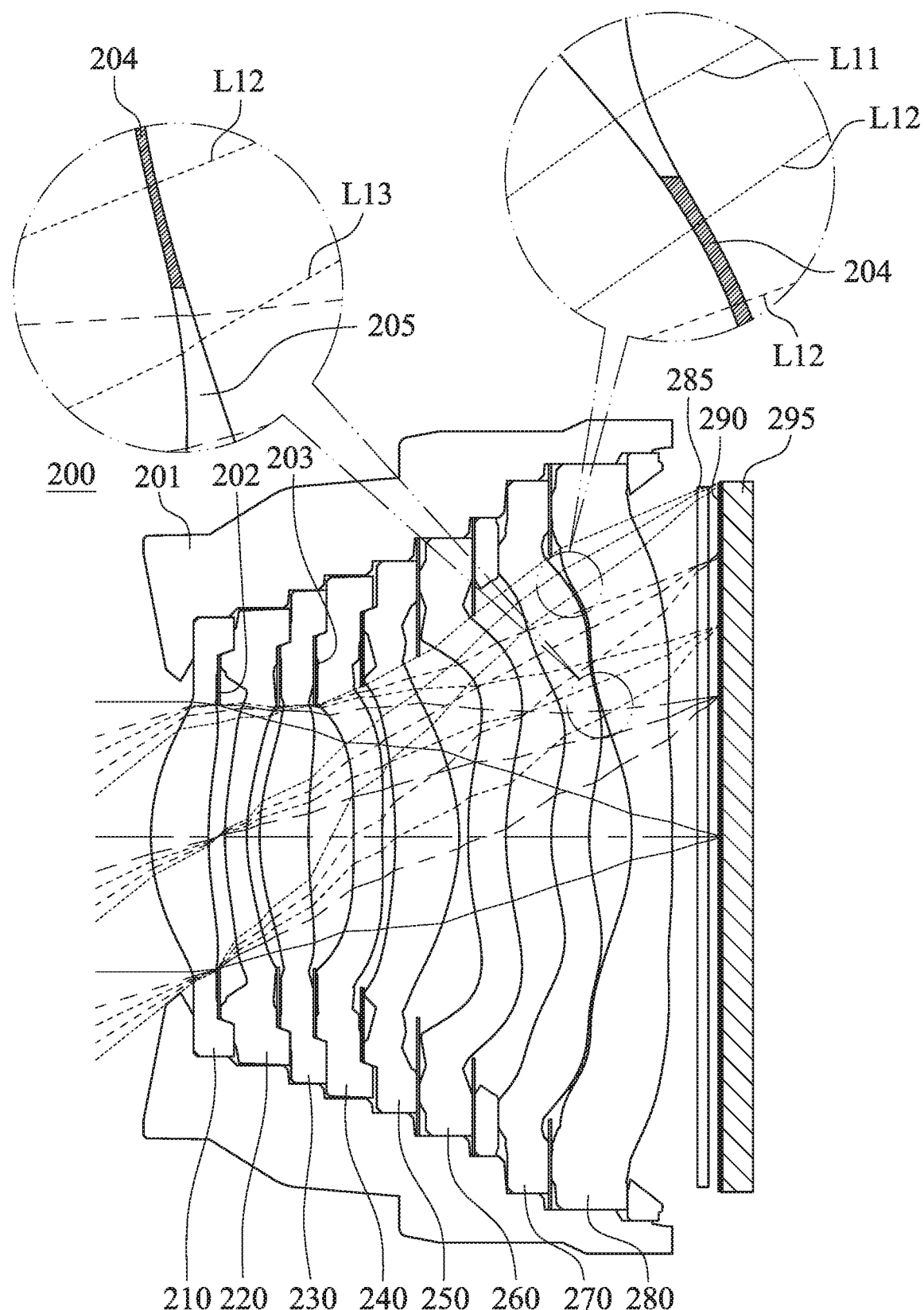
FIG. 2A is a schematic view of an imaging lens module according to the 2nd embodiment of the present disclosure.

FIG. 2A is a schematic view of an imaging lens module 200 according to the 2nd embodiment of the present disclosure. The imaging lens module 200 includes a plastic lens assembly (its reference numeral is omitted) and an image sensor 295, wherein the plastic lens assembly includes a barrel 201, a plurality of lens elements, a filter 285 and an image surface 290, the lens elements are disposed in the barrel 201, the image surface 290 is disposed on an image side of the barrel 201, and the image sensor 295 is disposed on the image surface 290.

In detail, the lens elements are, in order from the object side to the image side, a first lens element 210, a second lens element 220, a third lens element 230, a fourth lens element 240, a fifth lens element 250, a sixth lens element 260, a seventh lens element 270 and an eighth lens element 280, wherein the plastic lens assembly includes at least two plastic lens elements, and in the 2nd embodiment, the number of the plastic lens element is 8, wherein the seventh lens element 270 is defined as the first plastic lens element, and the eighth lens element 280 is defined as the second plastic lens element. Furthermore, the plastic lens assembly further includes an aperture stop 202 and a stop 203, wherein the aperture stop 202 is disposed between the first lens element 210 and the second lens element 220, and the stop 203 is disposed between the third lens element 230 and the fourth lens element 240.

The first plastic lens element (which is the seventh lens element 270) has a first optical effective portion (its reference numeral is omitted) and a first peripheral portion (its reference numeral is omitted), wherein the first peripheral portion surrounds the first optical effective portion. The second plastic lens element (which is the eighth lens element 280) has a second optical effective portion (its reference numeral is omitted) and a second peripheral portion (its reference numeral is omitted), wherein the second peripheral portion surrounds the second optical effective portion. The imaging lens module 200 includes a cementing glue coating 204, which is disposed between the first optical effective portion and the second optical effective portion, and for cementing the first plastic lens element and the second plastic lens element, wherein an optical gap 205 is formed between the first optical effective portion and the second optical effective portion, the cementing glue coating 204 is farther from a center of the first optical effective portion than the optical gap 205 is therefrom. As shown in FIG. 2A, a light path L11 shows the imaging light which does not pass through the cementing glue coating 204, a light path L12 shows the imaging light which passes through the cementing glue coating 204, and a light path L13 shows the imaging light which passes through the optical gap 205. Therefore, the converging situation of the imaging light from farther field of view can be adjusted by the arrangement of the cementing glue coating 204 without affecting the light gathering quality of the central field of view.

In detail, the optical gap 205 is an air gap, which is gradually reduced from a position close to a center region thereof to a peripheral region thereof. Both of two surfaces of the cementing glue coating 204 are aspheric. Both of two surfaces of the optical gap 205 are aspheric.

In the 2nd embodiment, when a refractive index of the optical gap 205 is Na, and a refractive index of the cementing glue coating 204 is Ng, the following condition is satisfied: 0.52<Na/Ng<1.0. In detail, the refractive index of the optical gap 205 Na is 1, the refractive index of the cementing glue coating 204 Ng is 1.485, and Na/Ng is 0.673. Furthermore, a refractive index of the first plastic lens element (which is the seventh lens element 270) is N1, and the value is 1.544, which satisfies the condition, Na/Ng<Na<N1/Na.

Figure 2B:
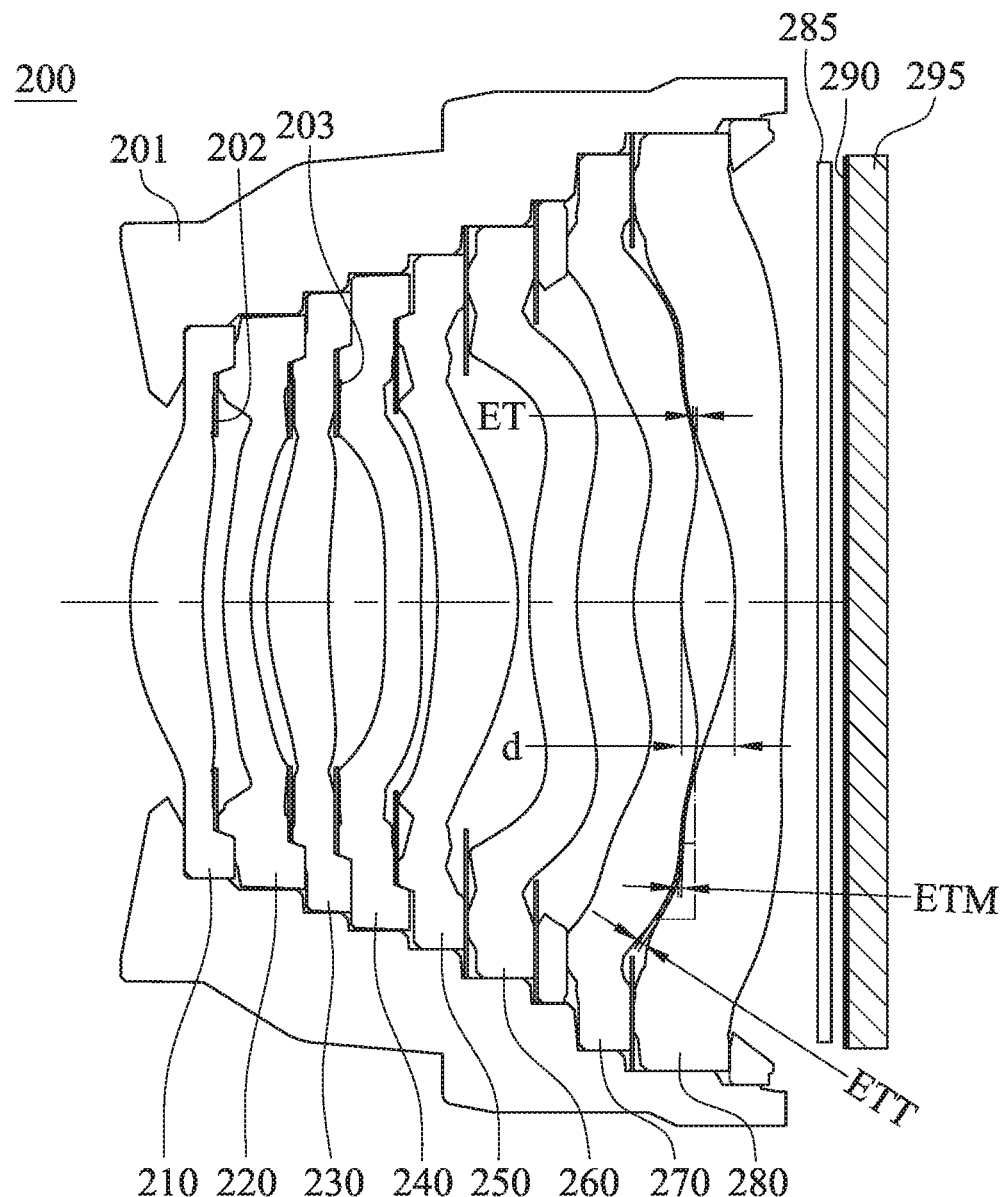
FIG. 2B is a schematic view of the parameters of the imaging lens module according to the 2nd embodiment in FIG. 2A.
Figure 2C:
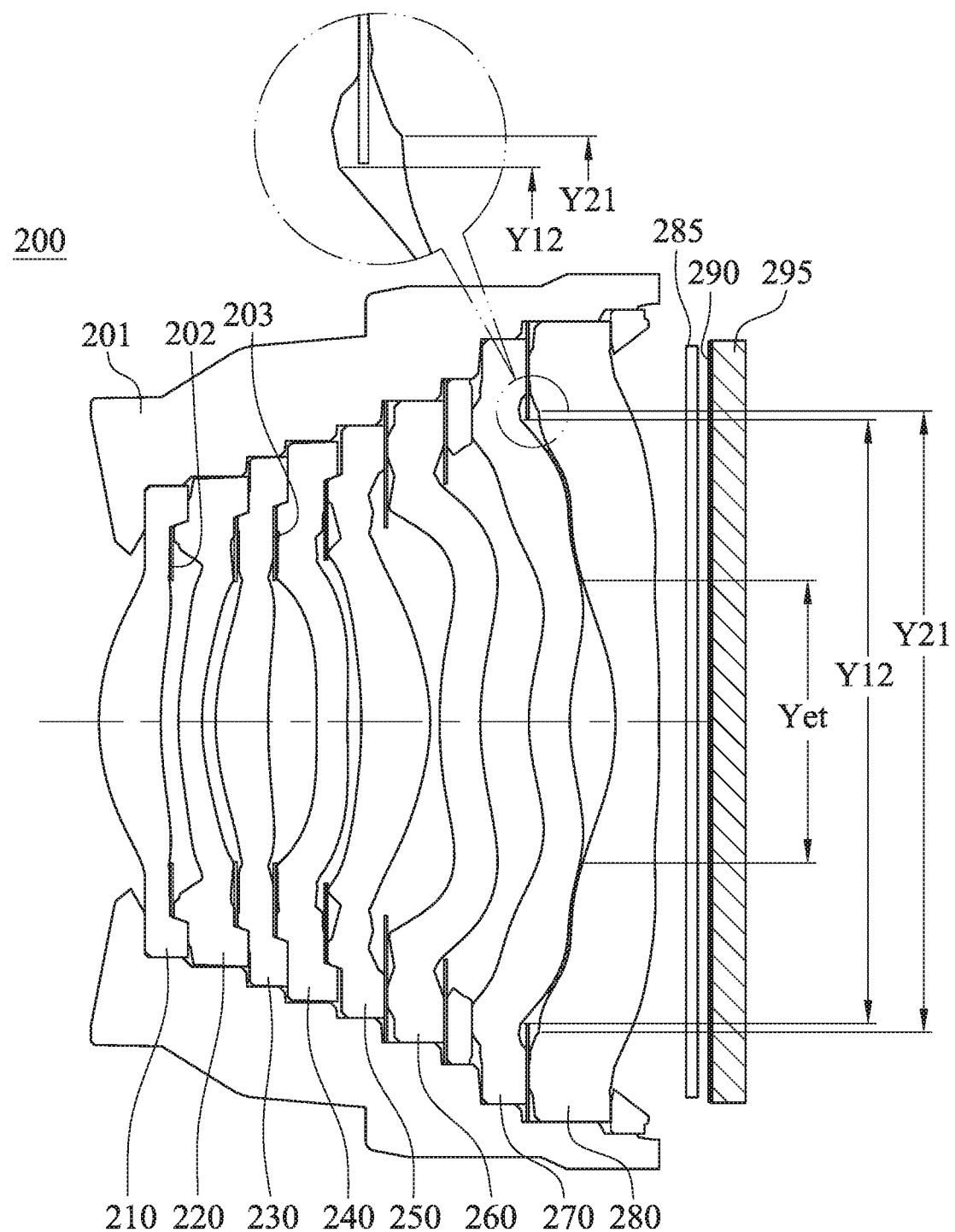
FIG. 2C is another schematic view of the parameters of the imaging lens module according to the 2nd embodiment in FIG. 2A.

FIG. 2B and FIG. 2C are schematic views of the parameters of the imaging lens module 200 according to the 2nd embodiment in FIG. 2A, respectively. As shown in FIG. 2B and FIG. 2C, when a width of the optical gap 205 close to the central axis of the plastic lens assembly is d, a maximum width of the optical gap 205 close to the cementing glue coating 204 is ET, a maximum width of the cementing glue coating 204 farthest from the optical gap 205 is ETT, a central width of the cementing glue coating 204 is ETM, a vertical distance between a position of the optical gap 205 farthest from the central axis and the central axis is Yet, a maximum radius of the optical effective portion of the first plastic lens element (that is, the seventh lens element 270) facing to the cementing glue coating 204 is Y12, and a maximum radius of the optical effective portion of the second plastic lens element (that is, the eighth lens element 280) facing to the cementing glue coating 204 is Y21, the data in the following Table 2A are satisfied.

TABLE 2A

| 2nd Embodiment | | | |
|---|---|---|---|
| d (mm) | 0.3880 | Yet (mm) | 2.4000 |
| ET (mm) | 0.0238 | Y12 (mm) | 5.1290 |
| ET/d | 0.0613 | Y21 (mm) | 5.2812 |
| ETM (mm) | 0.0227 | Yet/Y12 | 0.4679 |
| ETT (mm) | 0.0301 | Yet/Y21 | 0.4544 |
| ETT/ETM | 1.3260 | | |

Furthermore, the detailed optical data of the 2nd embodiment are shown in Table 2B and the aspheric surface data are shown in Table 2C below.

TABLE 2B

2nd Embodiment
f = 3.94 mm, Fno = 1.60, HFOV = 38.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.928 ASP | 0.525 | Plastic | 1.545 | 56.0 | 7.10 |

TABLE 2B-continued

2nd Embodiment
f = 3.94 mm, Fno = 1.60, HFOV = 38.6 deg.

| Surface # | | Curvature Radius | | Thickness | Material | Index | Abbe # | Focal Length |
|---|---|---|---|---|---|---|---|---|
| 2 | | 3.478 | ASP | 0.081 | | | | |
| 3 | Ape. Stop | Plano | | 0.068 | | | | |
| 4 | Lens 2 | 2.506 | ASP | 0.200 | Plastic | 1.671 | 19.5 | −10.52 |
| 5 | | 1.790 | ASP | 0.116 | | | | |
| 6 | Lens 3 | 1.963 | ASP | 0.446 | Plastic | 1.544 | 56.0 | 5.36 |
| 7 | | 5.527 | ASP | 0.056 | | | | |
| 8 | Stop | Plano | | 0.354 | | | | |
| 9 | Lens 4 | 186.578 | ASP | 0.262 | Plastic | 1.671 | 19.5 | −14.96 |
| 10 | | 9.516 | ASP | 0.118 | | | | |
| 11 | Lens 5 | −4.540 | ASP | 0.584 | Plastic | 1.544 | 56.0 | 4.24 |
| 12 | | −1.600 | ASP | 0.080 | | | | |
| 13 | Lens 6 | 4.352 | ASP | 0.345 | Plastic | 1.671 | 19.5 | −8.65 |
| 14 | | 2.408 | ASP | 0.412 | | | | |
| 15 | Lens 7 | 1.619 | ASP | 0.346 | Plastic | 1.544 | 56.0 | 20.86 |
| 16 | | 1.746 | ASP | 0.388 | Partial-cemented | | | |
| 17 | Lens 8 | −2.844 | ASP | 0.369 | Plastic | 1.535 | 55.8 | −4.56 |
| 18 | | 17.810 | ASP | 0.230 | | | | |
| 19 | Filter | Plano | | 0.100 | Glass | 1.517 | 64.2 | — |
| 20 | | Plano | | 0.107 | | | | |
| 21 | Image | Plano | | — | | | | |

Reference wavelength is 587.6 nm (d-line).
Effective radius of surface 8 (stop) is 1.200 mm.
Surface 16 is a partial-cemented surface at Y = 1.200 – 2.30 (which has Index = 1:485, Abbe # = 53.2)

TABLE 2C

Aspheric Coefficients

| Surface | 1 | 2 | 4 | 5 | 6 | 7 |
|---|---|---|---|---|---|---|
| k= | −7.5558E−02 | 1.8388E−01 | −2.6199E+01 | −1.2691E+01 | −7.7466E+00 | 7.7477E+00 |
| A4= | 1.9730E−03 | −5.9360E−02 | −6.8861E−03 | −1.7037E−02 | −9.3162E−03 | −3.1641E−02 |
| A6= | −1.5553E−02 | 3.7091E−02 | 4.0560E−03 | 7.8752E−02 | 7.6992E−02 | 9.5138E−04 |
| A8= | 5.9626E−03 | −7.6079E−02 | −4.7529E−02 | −1.5539E−01 | −1.5110E−01 | −1.1970E−02 |
| A10= | 2.7832E−03 | 4.5418E−02 | 3.8138E−02 | 1.4312E−01 | 1.3120E−01 | 1.3892E−03 |
| A12= | −9.8246E−03 | −9.5835E−03 | 5.1832E−03 | −5.8462E−02 | −8.1055E−02 | −1.3668E−02 |
| A14= | 2.6039E−03 | | −5.6365E−03 | 1.1309E−02 | 2.4939E−02 | 6.9141E−03 |

| Surface | 9 | 10 | 11 | 12 | 13 | 14 |
|---|---|---|---|---|---|---|
| k= | 9.0000E+01 | 4.6461E+01 | 8.9348E+00 | −1.4561E+00 | 2.4347E+00 | −6.0993E+00 |
| A4= | −2.2585E−01 | −3.3182E−01 | −2.1600E−01 | 1.6542E−01 | 1.1748E−01 | −6.9686E−02 |
| A6= | 3.4023E−01 | 9.4694E−01 | 1.2471E+00 | −1.4906E−01 | −2.5447E−01 | 7.9880E−02 |
| A8= | −8.9321E−01 | −2.0248E+00 | −2.6063E+00 | 3.8163E−02 | 2.6251E−01 | −8.2540E−02 |
| A10= | 1.2667E+00 | 2.2813E+00 | 2.8342E+00 | 1.8765E−02 | −2.1190E−01 | 3.8046E−02 |
| A12= | −9.2388E−01 | −1.3710E+00 | −1.7268E+00 | −1.5067E−02 | 1.1213E−01 | −8.7322E−03 |
| A14= | 3.1985E−01 | 4.1316E−01 | 5.8535E−01 | 4.5369E−03 | −3.5496E−02 | 9.0885E−04 |
| A16= | −4.0070E−02 | −4.8397E−02 | −1.0137E−01 | −6.0201E−04 | 5.9114E−03 | −2.7497E−05 |
| A18= | | −1.5452E−04 | 6.8673E−03 | | −3.8549E−04 | |

| Surface | 15 | 16 | 17 | 18 |
|---|---|---|---|---|
| k= | −4.1418E+00 | −3.2044E+00 | −1.4099E+01 | −6.9116E+01 |
| A4= | −1.3863E−01 | −1.9790E−01 | −3.3084E−01 | −2.0709E−01 |
| A6= | 7.9691E−02 | 1.6085E−01 | 5.0767E−01 | 2.5648E−01 |
| A8= | −1.6087E−01 | −1.9432E−01 | −3.9883E−01 | −1.4720E−01 |
| A10= | 1.3947E−01 | 1.4107E−01 | 1.8861E−01 | 4.7769E−02 |
| A12= | −6.0268E−02 | −5.5445E−02 | −5.5035E−02 | −9.5115E−03 |
| A14= | 1.4826E−02 | 1.2492E−02 | 9.9004E−03 | 1.1905E−03 |
| A16= | −2.1253E−03 | −1.6295E−03 | −1.0681E−03 | −9.1817E−05 |
| A18= | 1.6577E−04 | 1.1495E−04 | 6.3408E−05 | 4.0079E−06 |
| A20= | −5.4420E−06 | −3.4029E−06 | −1.5944E−06 | −7.6158E−08 |

In Table 2B shows the detailed optical data according to the 2nd embodiment of FIG. 2A, the curvature radius, the thickness and the focal length are shown in millimeters (mm). Surface numbers 0-21 represent the surfaces sequentially arranged from the object side to the image side along the optical axis. In Table 2C, k represents the conic coefficient of the equation of the aspheric surface profiles. A4-A20 represent the aspheric coefficients ranging from the 4th order to the 20th order. The tables presented below for the 3rd embodiment correspond to schematic parameter and aberration curves of each embodiment, and term definitions of the tables are the same as those in Table 2B and Table 2C of the 2nd embodiment. Therefore, an explanation in this regard will not be provided again.

3rd Embodiment

Figure 3A:
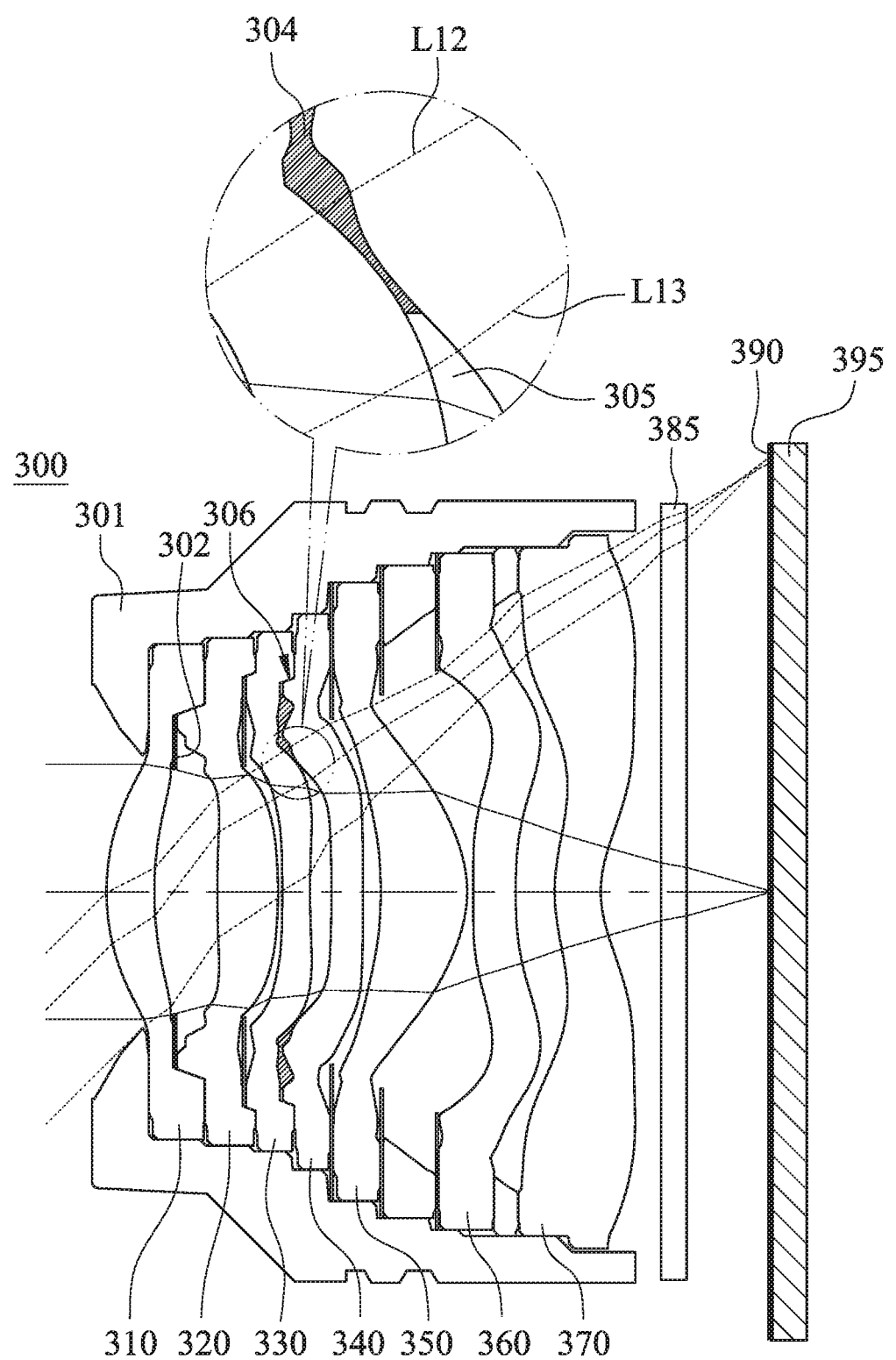
FIG. 3A is a schematic view of an imaging lens module according to the 3rd embodiment of the present disclosure.

FIG. 3A is a schematic view of an imaging lens module 300 according to the 3rd embodiment of the present disclosure. The imaging lens module 300 includes a plastic lens assembly (its reference numeral is omitted) and an image sensor 395, wherein the plastic lens assembly includes a barrel 301, a plurality of lens elements, a filter 385 and an image surface 390, the lens elements are disposed in the barrel 301, the image surface 390 is disposed on an image side of the barrel 301, and the image sensor 395 is disposed on the image surface 390.

In detail, the lens elements are, in order from the object side to the image side, a first lens element 310, a second lens element 320, a third lens element 330, a fourth lens element 340, a fifth lens element 350, a sixth lens element 360, and a seventh lens element 370, wherein the plastic lens assembly includes at least two plastic lens elements, and in the 3rd embodiment, the number of the plastic lens element is 8, wherein the third lens element 330 is defined as the first plastic lens element, and the fourth lens element 340 is defined as the second plastic lens element. Furthermore, the plastic lens assembly further includes an aperture stop 302, wherein the aperture stop 302 is disposed between the first lens element 310 and the second lens element 320.

The first plastic lens element (that is, the third lens element 330) has a first optical effective portion (its reference numeral is omitted) and a first peripheral portion (its reference numeral is omitted), wherein the first peripheral portion surrounds the first optical effective portion. The second plastic lens element (that is, the fourth lens element 340) has a second optical effective portion (its reference numeral is omitted) and a second peripheral portion (its reference numeral is omitted), wherein the second peripheral portion surrounds the second optical effective portion. The imaging lens module 300 includes a cementing glue coating 304, which is disposed between the first optical effective portion and the second optical effective portion, and for cementing the first plastic lens element and the second plastic lens element, wherein an optical gap 305 is formed between the first optical effective portion and the second optical effective portion, the cementing glue coating 304 is farther from a center of the first optical effective portion than the optical gap 305 is therefrom. As shown in FIG. 3A, a light path L12 shows the imaging light which passes through the cementing glue coating 304, and a light path L13 shows the imaging light which passes through the optical gap 305. Therefore, the converging situation of the imaging light from farther field of view can be adjusted by the arrangement of the cementing glue coating 304 without affecting the light gathering quality of the central field of view.

In detail, the optical gap 305 is an air gap, which is gradually reduced from a position close to a center region thereof to a peripheral region thereof. Both of two surfaces of the cementing glue coating 304 are aspheric. Both of two surfaces of the optical gap 305 are aspheric.

Moreover, the plastic lens assembly can further include an aligning structure 306 for aligning the first plastic lens element and the second plastic lens element with each other, wherein the optical gap 305, the cementing glue coating 304 and the aligning structure 306 are far away from a central axis of the plastic lens assembly along a direction far from the central axis in sequence. In the 3rd embodiment, the aligning structure 306 includes two surface structures (its reference numeral is omitted) on the first plastic lens element and the second plastic lens element, respectively, and the present disclosure will not be limited thereto.

In the 3rd embodiment, when a refractive index of the optical gap 305 is Na, and a refractive index of the cementing glue coating 304 is Ng, the following condition is satisfied: $0.52<Na/Ng<1.0$. In detail, the refractive index of the optical gap 305 Na is 1, the refractive index of the cementing glue coating 304 Ng is 1.485, and Na/Ng is 0.673. Furthermore, a refractive index of the first plastic lens element (that is, the third lens element 330) is N1, and the value is 1.669, which satisfies the condition, $Na/Ng<Na<N1/Na$.

Figure 3B:
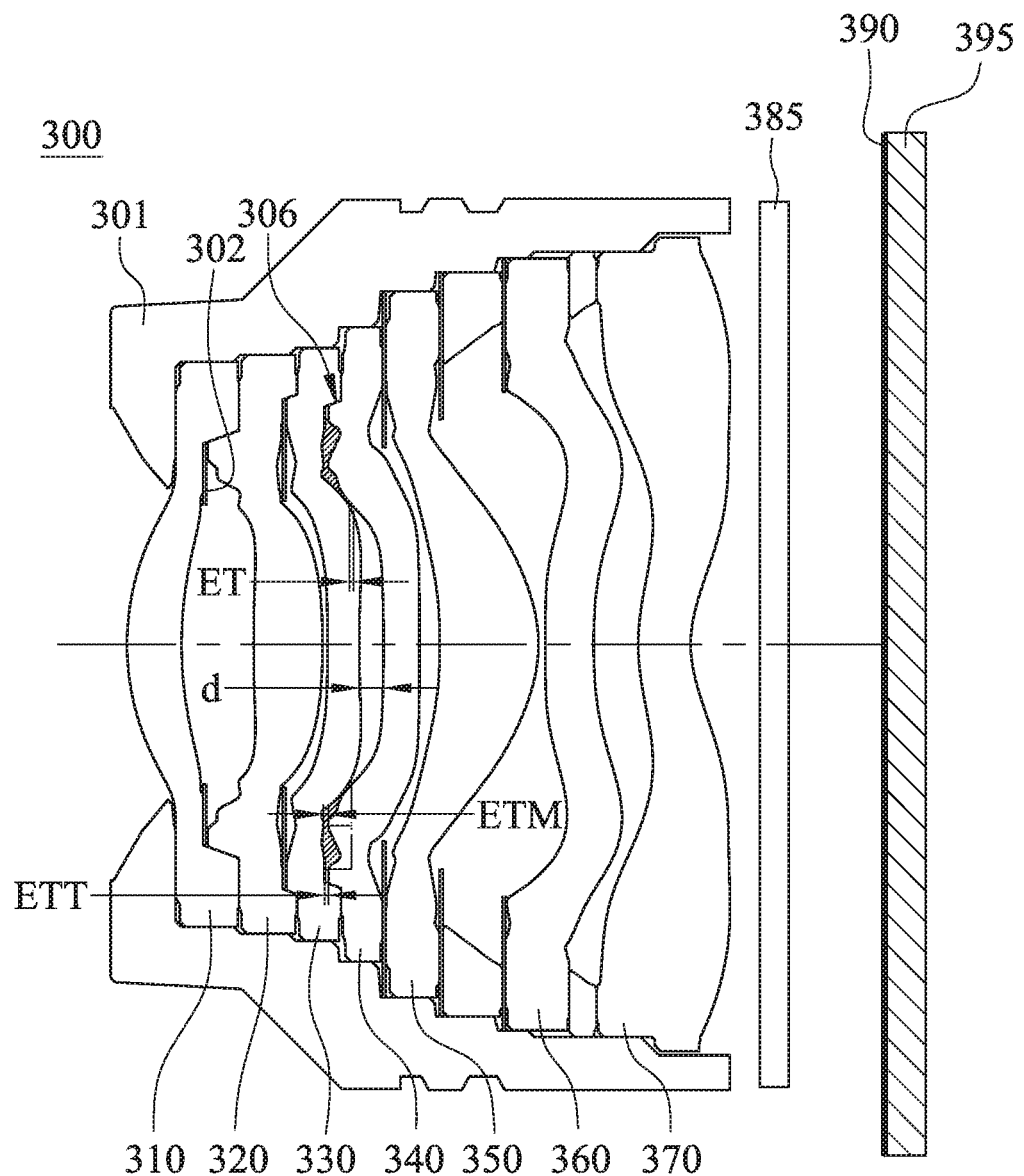
FIG. 3B is a schematic view of the parameter of the imaging lens module according to the 3rd embodiment in FIG. 3A.
Figure 3C:
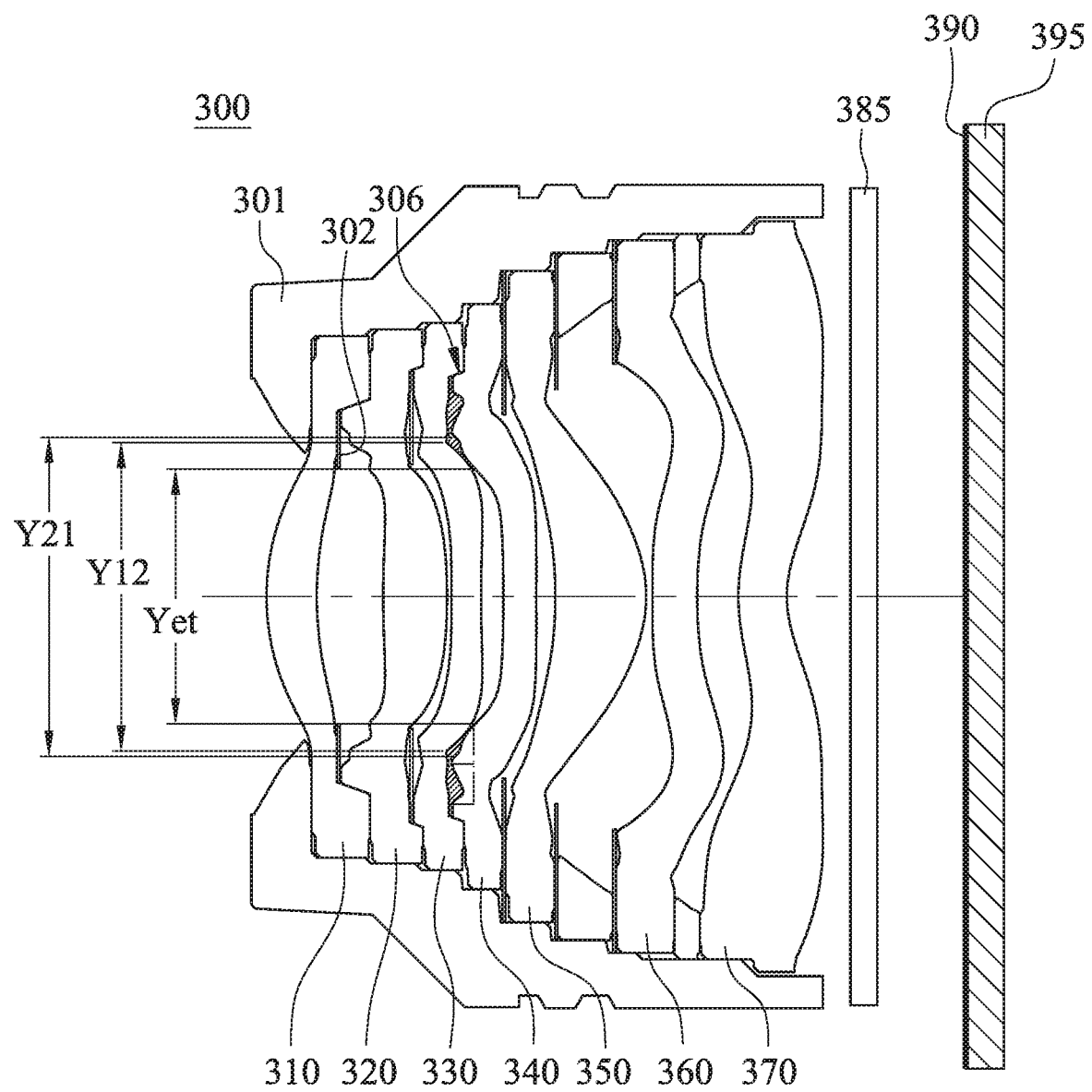
FIG. 3C is another schematic view of the parameter of the imaging lens module according to the 3rd embodiment in FIG. 3A.

FIG. 3B and FIG. 3C are schematic views of the parameters of the imaging lens module 300 according to the 3rd embodiment in FIG. 3A, respectively. As shown in FIG. 3B and FIG. 3C, when a width of the optical gap 305 close to the central axis of the plastic lens assembly is d, a maximum width of the optical gap 305 close to the cementing glue coating 304 is ET, a maximum width of the cementing glue coating 304 farthest from the optical gap 305 is ETT, a central width of the cementing glue coating 304 is ETM, a vertical distance between a position of the optical gap 305 farthest from the central axis and the central axis is Yet, a maximum radius of the optical effective portion of the first plastic lens element (that is, the third lens element 330) facing to the cementing glue coating 304 is Y12, and a maximum radius of the optical effective portion of the second plastic lens element (that is, the fourth lens element 340) facing to the cementing glue coating 304 is Y21, the data in the following Table 3A are satisfied.

TABLE 3A

3rd Embodiment

| | | | |
|---|---|---|---|
| d (mm) | 0.1760 | Yet (mm) | 2.0000 |
| ET (mm) | 0.0297 | Y12 (mm) | 2.4237 |
| ET/d | 0.1688 | Y21 (mm) | 2.5078 |
| ETM (mm) | 0.0361 | Yet/Y12 | 0.8252 |
| ETT (mm) | 0.0295 | Yet/Y21 | 0.7975 |
| ETT/ETM | 0.8172 | | |

Furthermore, the detailed optical data of the 3rd embodiment are shown in Table 3B and the aspheric surface data are shown in Table 3C below.

TABLE 3B

3rd Embodiment
f = 3.90 mm, Fno = 1.85, HFOV = 44.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.870 | ASP | 0.395 | Plastic | 1.545 | 56.1 | 8.43 |
| 2 | | 2.917 | ASP | 0.157 | | | | |

TABLE 3B-continued

3rd Embodiment
f = 3.90 mm, Fno = 1.85, HFOV = 44.9 deg.

| Surface # | | Curvature Radius | | Thickness | Material | Index | Abbe # | Focal Length |
|---|---|---|---|---|---|---|---|---|
| 3 | Ape. Stop | Plano | | 0.364 | | | | |
| 4 | Lens 2 | 8.310 | ASP | 0.501 | Plastic | 1.544 | 56.0 | 5.13 |
| 5 | | −4.111 | ASP | 0.036 | | | | |
| 6 | Lens 3 | −11.953 | ASP | 0.230 | Plastic | 1.669 | 19.5 | −7.89 |
| 7 | | 9.527 | ASP | 0.176 | Partial-cemented | | | |
| 8 | Lens 4 | −14.001 | ASP | 0.259 | Plastic | 1.614 | 26.0 | −12.51 |
| 9 | | 17.107 | ASP | 0.148 | | | | |
| 10 | Lens 5 | −4.745 | ASP | 0.715 | Plastic | 1.566 | 37.4 | 2.18 |
| 11 | | −1.034 | ASP | 0.050 | | | | |
| 12 | Lens 6 | −33.778 | ASP | 0.350 | Plastic | 1.669 | 19.5 | −5.86 |
| 13 | | 4.453 | ASP | 0.323 | | | | |
| 14 | Lens 7 | 1.548 | ASP | 0.380 | Plastic | 1.614 | 26.0 | −4.34 |
| 15 | | 0.888 | ASP | 0.500 | | | | |
| 16 | Filter | Plano | | 0.210 | Glass | 1.517 | 64.2 | — |
| 17 | | Plano | | 0.695 | | | | |
| 18 | Image | Plano | | — | | | | |

Reference wavelength is 587.6 nm (d-line).
Effective radius of surface 1 is 1.100 mm.
Effective radius of surface 5 is 1.030 mm.
Surface 7 is a partial-cemented surface at Y ≥ 1.000 (which has Index = 1.485, Abbe # = 53.2)
Effective radius of surface 15 is 2.829 mm.

TABLE 3C

Aspheric Coefficient

| Surface | 1 | 2 | 4 | 5 | 6 | 7 |
|---|---|---|---|---|---|---|
| k= | −6.3418E−01 | −3.4237E+00 | −5.0668E+01 | −3.1188E+01 | −2.3409E+01 | −9.9000E+01 |
| A4= | −7.6189E−03 | 2.5469E−02 | −8.6188E−03 | 7.2230E−03 | 9.2689E−02 | 5.7203E−02 |
| A6= | 1.0132E−01 | −9.7951E−03 | −1.3633E−02 | −8.7498E−01 | −1.2826E+00 | −3.7118E−01 |
| A8= | −1.8030E−01 | −3.1281E−02 | 1.1528E−01 | 1.9295E+00 | 2.6985E+00 | 2.7501E−01 |
| A10= | 1.4707E−01 | −7.5113E−03 | −1.4368E−01 | −1.8815E+00 | −2.3399E+00 | 1.2980E−02 |
| A12= | −5.4890E−02 | | | 6.4170E−01 | 7.0633E−01 | −1.4344E−01 |
| A14= | | | | | | 5.3868E−02 |

| Surface | 8 | 9 | 10 | 11 | 12 | 13 |
|---|---|---|---|---|---|---|
| k= | 7.6259E+01 | 9.9000E+01 | 1.8113E+00 | −1.5471E+00 | −8.1988E+01 | −5.8189E+01 |
| A4= | −8.3072E−02 | −3.4448E−01 | −4.2034E−01 | 1.5306E−01 | 3.7926E−01 | 2.2470E−01 |
| A6= | 3.9448E−01 | 1.0686E+00 | 1.1670E+00 | −1.6892E−01 | −3.4175E−01 | −8.8248E−02 |
| A8= | −7.3201E−01 | −1.6700E+00 | −1.6283E+00 | 1.3803E−01 | 1.1931E−01 | −1.6631E−01 |
| A10= | −3.4414E−01 | 1.1691E+00 | 1.3193E+00 | −2.9879E−01 | −2.7492E−02 | 2.0415E−01 |
| A12= | 8.9906E−01 | −3.6931E−01 | −6.1799E−01 | 3.9985E−01 | 2.4759E−02 | −1.1091E−01 |
| A14= | −3.1315E−01 | 4.2129E−02 | 1.5286E−01 | −2.5576E−01 | −2.0659E−02 | 3.4317E−02 |
| A16= | | | −1.5276E−02 | 8.2627E−02 | 7.9848E−03 | −6.1572E−03 |
| A18= | | | | −1.2945E−02 | −1.4435E−03 | 5.9485E−04 |
| A20= | | | | 7.7865E−04 | 1.0015E−04 | −2.3936E−05 |

| Surface | 14 | 15 |
|---|---|---|
| k= | −2.2259E+00 | −3.8165E+00 |
| A4= | −2.4979E−01 | −1.3990E−01 |
| A6= | 4.2645E−02 | 1.3821E−02 |
| A8= | 3.5805E−02 | 2.5087E−02 |
| A10= | −2.8988E−02 | −1.2661E−02 |
| A12= | 1.0798E−02 | 2.8643E−03 |
| A14= | −2.3387E−03 | −3.6337E−04 |
| A16= | 2.9595E−04 | 2.6497E−05 |
| A18= | −2.0213E−05 | −1.0290E−06 |
| A20= | 5.7473E−07 | 1.6240E−08 |

4th Embodiment

Figure 4A:
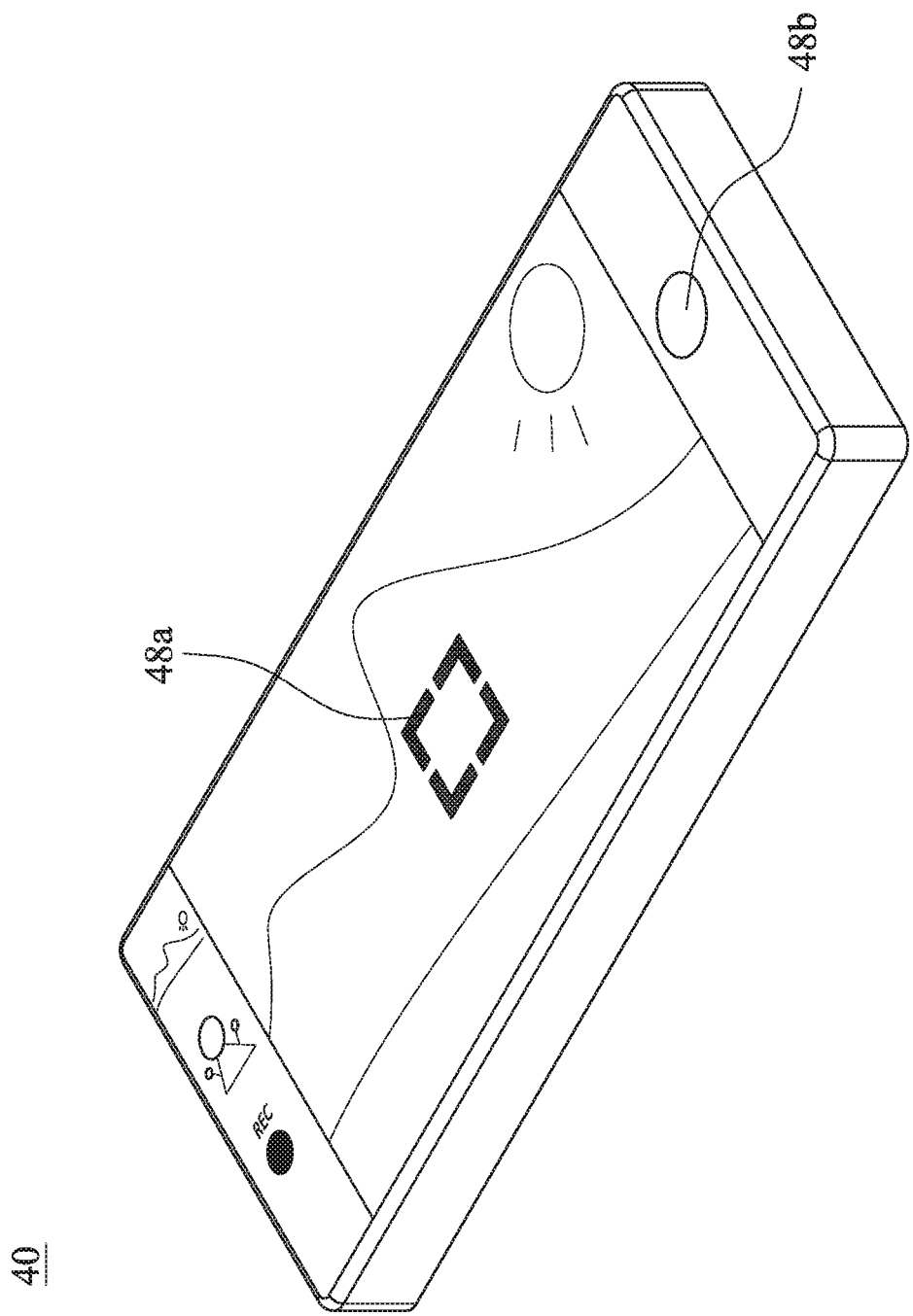
FIG. 4A is a schematic view of an electronic device according to the 4th embodiment of the present disclosure.
Figure 4B:
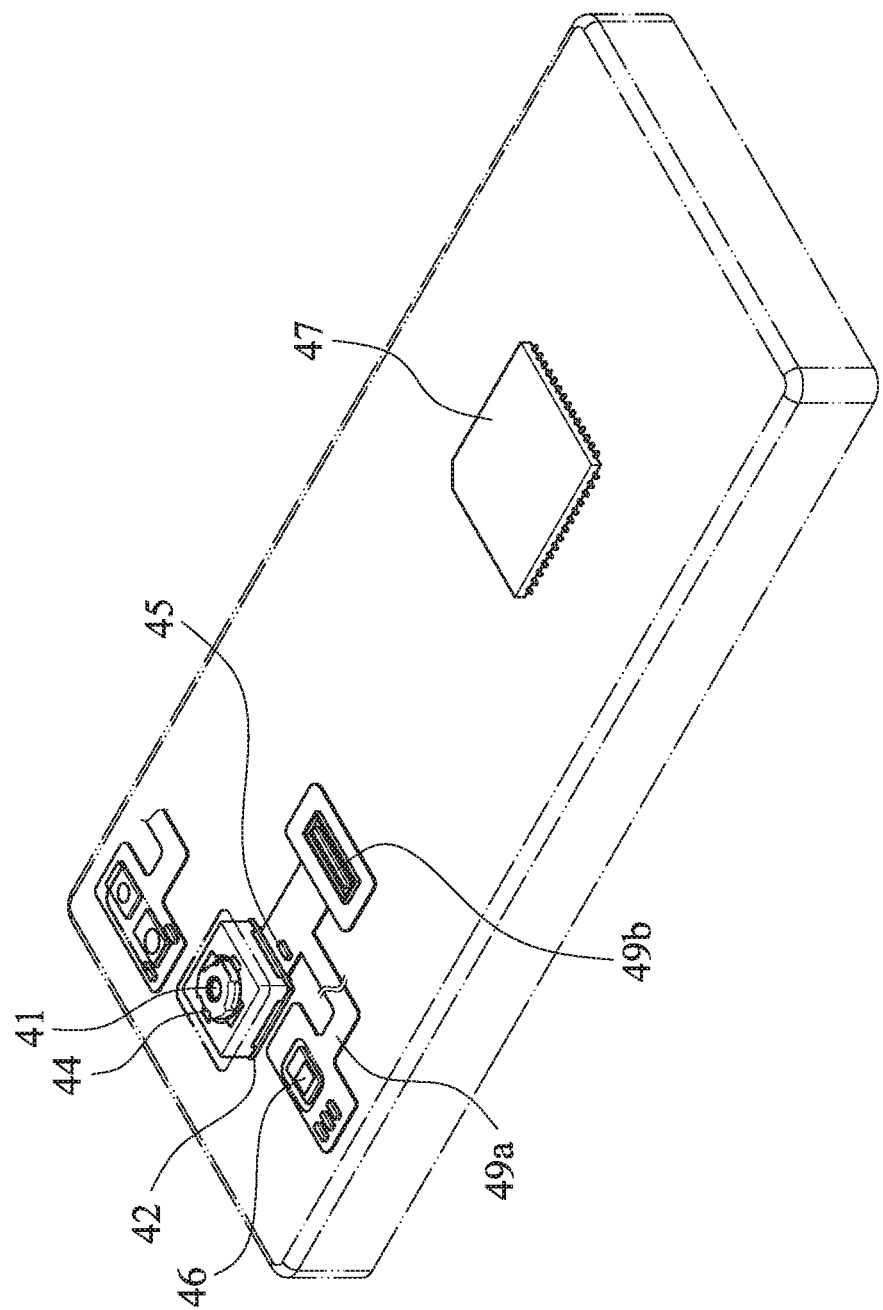
FIG. 4B is another schematic view of the electronic device of the 4th embodiment.

FIG. 4A is a schematic view of an electronic device 40 according to the 4th embodiment of the present disclosure. FIG. 4B is another schematic view of the electronic device 40 of the 4th embodiment. In FIG. 4A and FIG. 4B, the electronic device 40 of the 4th embodiment is a smartphone, the electronic device 40 includes the imaging lens module 41 according to the present disclosure, wherein the imaging lens module 41 can be the imaging lens module of any one of the aforementioned embodiments, but will not be limited thereto. The imaging lens module 41 can include a plastic lens assembly 41a and an image sensor 42, the image sensor 42 is disposed on an image surface (not shown) of the plastic lens assembly 41a. Therefore, it is favorable for satisfying requirements of the mass production and appearance of the imaging lens module applied to the electronic device nowaday.

Specifically, the user activates the shooting mode by the user interface 48 of the electronic device 40, wherein the user interface of the 4th embodiment can be a touch screen 48a, a button 48b, etc. At this moment, the imaging lens module 41 collects the imaging light on the image sensor 42 and outputs an electronic signal about the image to an Image Signal Processor (ISP) 47.

Figure 4C:
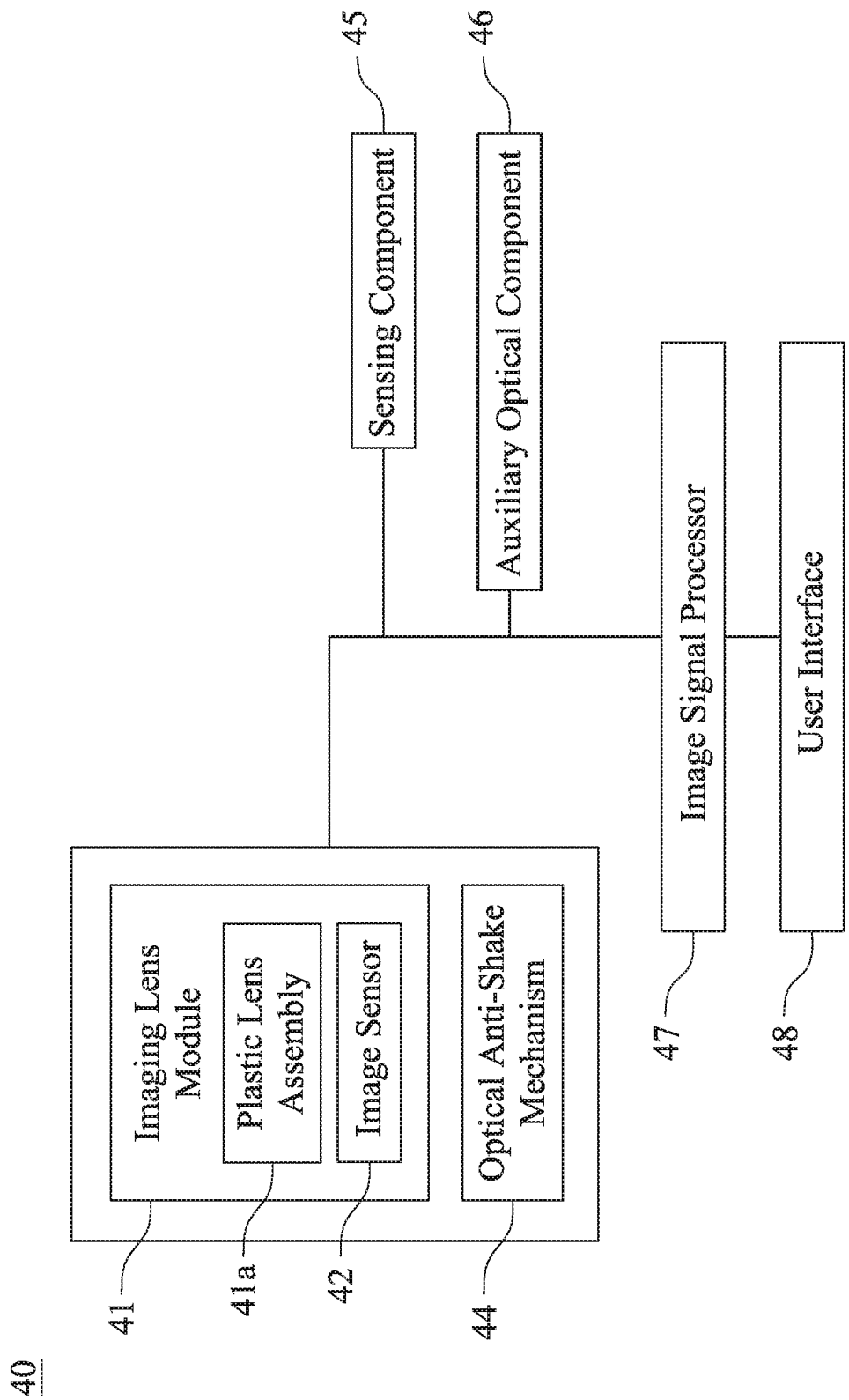
FIG. 4C is a block diagram of the electronic device of the 4th embodiment.

FIG. 4C shows a block diagram of the electronic device 40 according to the 4th embodiment, and particularly a camera block diagram in the electronic device 40. In FIGS. 4A to 4C, in response to the camera specifications of the electronic device 40, the electronic device 40 may further include an optical anti-shake component 44. Furthermore, the electronic device 40 can further include at least one auxiliary optical component 46 and at least one sensing component 45. The auxiliary optical component 46 can be a flash module that compensates for color temperature, an infrared ranging component, a laser focusing module, etc. The sensing component 45 can have a function of sensing physical momentum and actuation energy, such as an accelerometer, a gyroscope, and a Hall Effect Element to sense the shaking and shaking applied by the user's hand or the external environment. Further, the autofocus function and the optical anti-shake component 44 configured by the imaging lens module 41 in the electronic device 40 are facilitated to obtain good imaging quality, and the electronic device 40 according to the present disclosure has a plurality of modes of shooting functions, such as optimized self-timer, low light source HDR (High Dynamic Range imaging), high resolution 4K (4K Resolution) video. Moreover, the user can directly view the camera's shooting screen from the touch screen and manually operate the viewing range on the touch screen to achieve the autofocus function of what you see is what you get.

Furthermore, in FIG. 4B, the imaging lens module 41, the image sensor 42, the optical anti-shake mechanism 44, the sensing component 45 and the auxiliary optical component 46 can be disposed on a Flexible Printed Circuit Board (FPC) 49a and electrically connected to the imaging signal processor 47 through the connector 49b to execute the photographing process. The current electronic devices, such as smart phones, have a thin and light trend. The camera module and its imaging lens and related components are arranged on a flexible circuit board, and then the circuit is integrated into the main board of the electronic device by using a connector, which can meet the limited space of the mechanism design and the circuit layout requirements, and the greater margin is achieved, and the autofocus function of the imaging lens is more flexibly controlled by the touch screen of the electronic device. In the 4th embodiment, the electronic device 40 can include a plurality of the sensing components 45 and a plurality of the auxiliary optical components 46. The sensing components 45 and the auxiliary optical components 46 are disposed on the FPC board 49a and at least one other FPC board (no label) and electrically connected to the imaging signal processor 47 through the corresponding connector to execute the photographing process. In other embodiments (no view), the sensing element and the auxiliary optical element can also be disposed on the main board of the electronic device or other forms of the carrier according to the mechanism design and the circuit layout requirements.

Furthermore, the electronic device 40 can further include, but is not limited to, a display unit, a control unit, a storage unit, a Random Access Memory unit (RAM), a Read-Only Memory unit (ROM), or a combination thereof.

5th Embodiment

Figure 5:
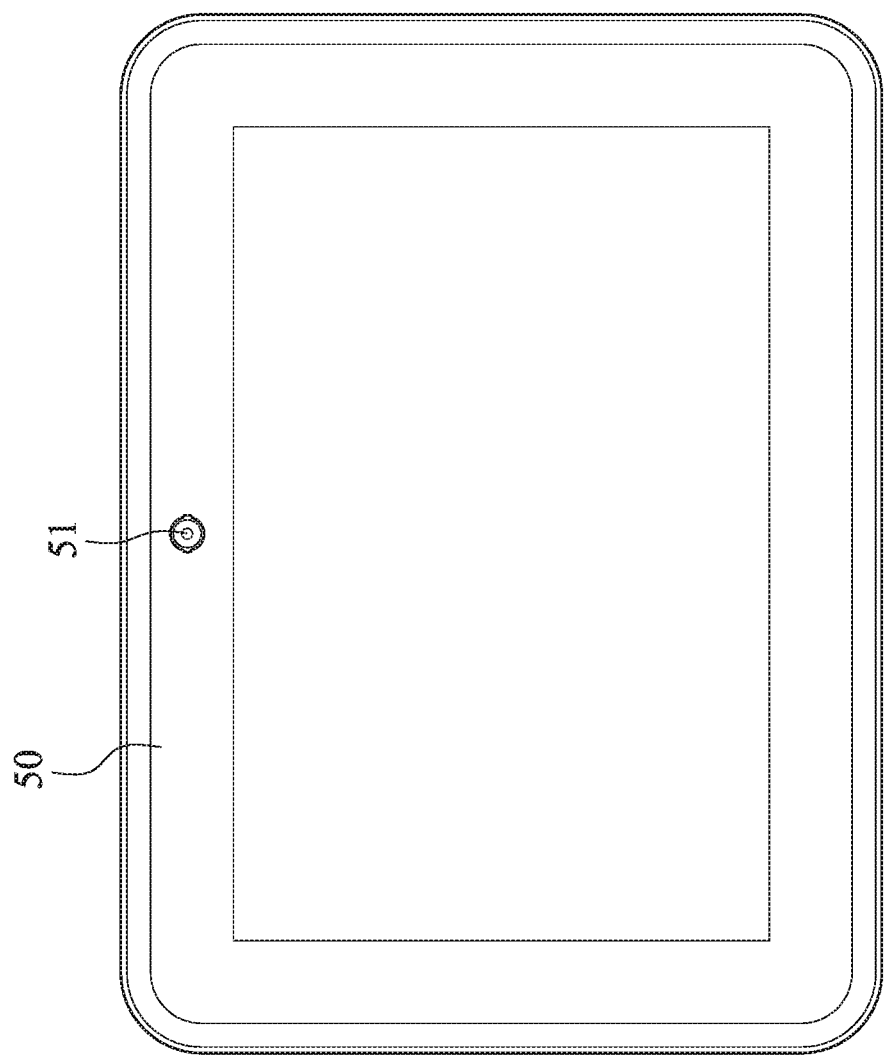
FIG. 5 is a schematic view of an electronic device according to the 5th embodiment of the present disclosure.

FIG. 5 shows a schematic view of an electronic device 50 according to the 5th embodiment of the present disclosure. The electronic device 50 of the 5th embodiment is a tablet computer. The electronic device 50 includes a imaging lens module 51 according to the present disclosure, wherein the imaging lens module 51 includes a plastic lens assembly (not shown) and an image sensor (not shown), the image sensor is disposed on an image surface (not shown) of the plastic lens assembly.

6th Embodiment

Figure 6:
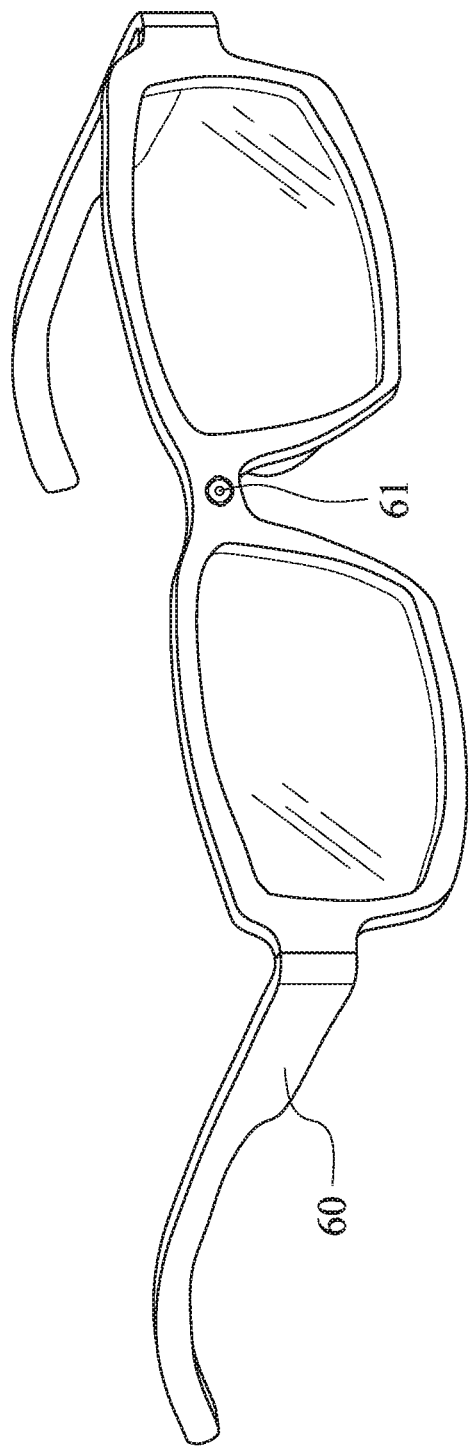
FIG. 6 is a schematic view of an electronic device according to the 6th embodiment of the present disclosure.

FIG. 6 shows a schematic view of an electronic device 60 according to the 6th embodiment of the present disclosure. The electronic device 60 of the 6th embodiment is a wearable device. The electronic device 60 includes a imaging lens module 61 according to the present disclosure, wherein the imaging lens module 61 includes a plastic lens assembly (not shown) and an image sensor (not shown), the image sensor is disposed on an image surface (not shown) of the plastic lens assembly.

The foregoing description, for purpose of explanation, has been described with reference to specific embodiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:
1. A plastic lens assembly, comprising:
    at least two plastic lens elements comprising:
        a first plastic lens element having a first optical effective portion and a first peripheral portion, wherein the first peripheral portion surrounds the first optical effective portion; and
        a second plastic lens element having a second optical effective portion and a second peripheral portion, wherein the second peripheral portion surrounds the second optical effective portion; and
    at least one cementing glue coating disposed between the first optical effective portion and the second optical effective portion, wherein at least one optical gap is formed between the first optical effective portion and the second optical effective portion, the cementing glue coating is farther from a center of the first optical effective portion than the optical gap is therefrom, the at least one cementing glue coating is located between the first optical effective portion of the first plastic lens element and the second optical effective portion of the second plastic lens element along a direction parallel to a central axis of the plastic assembly, and the at least one optical gap is located between the first optical effective portion of the first plastic lens element and the second optical effective portion of the second plastic lens element along the direction parallel to the central axis of the plastic assembly;

wherein a refractive index of the optical gap is Na, a refractive index of the cementing glue coating is Ng, and the following condition is satisfied:

0.52<$Na/Ng$<1.0.

2. The plastic lens assembly of claim 1, wherein the optical gap is an air gap.

3. The plastic lens assembly of claim 2, wherein the refractive index of the optical gap is Na, the refractive index of the cementing glue coating is Ng, a refractive index of the first plastic lens element is N1, and the following condition is satisfied:

$Na/Ng$<$Na$<$N1/Na$.

4. The plastic lens assembly of claim 2, wherein two surfaces of the cementing glue coating are aspheric.

5. The plastic lens assembly of claim 2, wherein two surfaces of the optical gap are aspheric.

6. The plastic lens assembly of claim 2, further comprising:

an aligning structure for aligning the first plastic lens element and the second plastic lens element with each other, wherein the optical gap, the cementing glue coating and the aligning structure are far away from a central axis of the plastic lens assembly along a direction far from the central axis in sequence.

7. The plastic lens assembly of claim 2, wherein a width of the optical gap close to a central axis of the plastic lens assembly is d, a maximum width of the optical gap close to the cementing glue coating is ET, and the following condition is satisfied:

0<$ET/d$<0.90.

8. The plastic lens assembly of claim 7, wherein the width of the optical gap close to the central axis of the plastic lens assembly is d, the maximum width of the optical gap close to the cementing glue coating is ET, and the following condition is satisfied:

0<$ET/d$<0.40.

9. The plastic lens assembly of claim 7, wherein a maximum width of the cementing glue coating farthest from the optical gap is ETT, a central width of the cementing glue coating is ETM, and the following condition is satisfied:

0.1<$ETT/ETM$<1.5.

10. The plastic lens assembly of claim 7, wherein the maximum width of the optical gap close to the cementing glue coating is ET, a central width of the cementing glue coating is ETM, and the following condition is satisfied:

0.1<$ET/ETM$<1.5.

11. The plastic lens assembly of claim 10, wherein the maximum width of the optical gap close to the cementing glue coating is ET, the central width of the cementing glue coating is ETM, and the following condition is satisfied:

0.1<$ET/ETM$<1.0.

12. The plastic lens assembly of claim 11, wherein the optical gap is gradually reduced from a position close to a center region thereof to a peripheral region thereof.

13. The plastic lens assembly of claim 7, wherein a vertical distance between a position of the optical gap farthest from the central axis and the central axis is Yet, a maximum radius of the optical effective portion of the first plastic lens element facing to the cementing glue coating is Y12, and the following condition is satisfied:

$Yet/Y12$<0.95.

14. The plastic lens assembly of claim 13, wherein the vertical distance between the position of the optical gap farthest from the central axis and the central axis is Yet, the maximum radius of the optical effective portion of the first plastic lens element facing to the cementing glue coating is Y12, and the following condition is satisfied:

$Yet/Y12$<0.85.

15. The plastic lens assembly of claim 7, wherein a vertical distance between a position of the optical gap farthest from the central axis and the central axis is Yet, a maximum radius of the optical effective portion of the second plastic lens element facing to the cementing glue coating is Y21, and the following condition is satisfied:

$Yet/Y21$<0.95.

16. The plastic lens assembly of claim 15, wherein the vertical distance between the position of the optical gap farthest from the central axis and the central axis is Yet, the maximum radius of the optical effective portion of the second plastic lens element facing to the cementing glue coating is Y21, and the following condition is satisfied:

$Yet/Y21$<0.85.

17. The plastic lens assembly of claim 1, wherein a central thickness of the cementing glue coating is ETM, and the following condition is satisfied:

0.02 mm<$ETM$<0.12 mm.

18. The plastic lens assembly of claim 1, wherein the refractive index of the optical gap is Na, the refractive index of the cementing glue coating is Ng, and the following condition is satisfied:

0.56<$Na/Ng$<0.80.

19. An imaging lens module, comprising:
the plastic lens assembly of claim 1.

20. An electronic device, comprising:
the imaging lens module of claim 19.

* * * * *